United States Patent [19]

Tse

[11] 4,272,234
[45] Jun. 9, 1981

[54] PELLETIZING APPARATUS

[75] Inventor: Samuel Y. H. Tse, Calgary, Canada

[73] Assignee: Procor Limited, Oakville, Canada

[21] Appl. No.: 88,235

[22] Filed: Oct. 25, 1979

[30] Foreign Application Priority Data

Nov. 6, 1978 [CA] Canada .................................. 315863

[51] Int. Cl.³ .............................................. B22F 3/00
[52] U.S. Cl. ................................................. 425/222
[58] Field of Search ...................................... 425/222

[56] References Cited

U.S. PATENT DOCUMENTS

| 1,994,718 | 3/1935 | Lellep | 425/222 |
| 2,926,079 | 2/1960 | Smith | 425/222 |
| 3,580,545 | 5/1971 | O'Brien | 425/222 |
| 3,830,943 | 8/1974 | Hix et al. | 425/222 |
| 3,877,415 | 4/1975 | Blouin | 427/424 |

*Primary Examiner*—Donald E. Czaja
*Assistant Examiner*—James R. Hall
*Attorney, Agent, or Firm*—Charles M. Kaplan; Joel E. Siegel

[57] ABSTRACT

Solid sulfur pellets are made by dropping sulfur particles in two distinct curtains of particles within a drum having a tumbling bed of such particles. The larger curtain of particles is sprayed with molten sulfur and the smaller is sprayed with water above the bed. This indirect application of water keeps the temperature of the bed as well as the other curtain of particles being sprayed with sulfur within predetermined temperature ranges which produce high quality sulfur pellets. Dust emissions are prevented by classifying as to size a third falling curtain of recycled particles and spraying molten sulfur on the side containing dust particles. Seed nuclei are produced by intermittently raising the temperature of the tumbling particle bed about 40° F. for short periods of time.

10 Claims, 4 Drawing Figures

PELLETIZING APPARATUS

BACKGROUND OF THE INVENTION

This invention relates to apparatus for producing pellets, and more particularly to the production of relatively small sulfur pellets.

Pellets have been made by spraying molten or dissolved chemicals onto falling particles, and pellets have been coated with sulfur by this technique. However, this procedure has not been used to produce solid sulfur pellets.

OBJECTIVES OF THE INVENTION

Accordingly, it is an object of this invention to provide improved apparatus for producing sulfur pellets.

Another object is to control the temperature of a falling curtain of particles as they are sprayed with molten chemical.

Another object is to reduce air pollution resulting from escape of sulfur dust.

Another object is to produce seed nuclei for coating with molten sulfur without requiring specialized equipment.

Another object is to eliminate problems caused by spraying water directly on a bed of rotating particles that are being coated with a molten chemical.

Another object is to reduce breakage of falling particles in the drum of a sulfur pelletizing system.

Another object is to produce high density, relatively moisture-free, generally spherical sulfur pellets that do not have voids or surface stress areas, and that have a predetermined relatively uniform size.

Another object is to provide pellet producing apparatus that are continuously operating, easy to adjust, maintain and control, relatively inexpensive, pollution-free, and which do not contain defects found in the prior art.

Other objects and advantages of the invention will be apparent from the specification and claims, and the scope of the invention will be pointed out in the claims.

SUMMARY OF THE INVENTION

Briefly stated, according to one aspect of the invention, a zone where falling particles are sprayed with a coating substance is coold indirectly by wetting some of the paticles at a different location and then dropping them through the zone. Another aspect of the invention involves two separated and distinct curtains of particles that are formed by deflection, and one curtain is sprayed with molten sulfur while the other is sprayed with water. Another aspect of the invention results in the production of seed particles by raising the temperature of a rotating bed of sulfur particles by about 40° F. for a short time. Another aspect of the invention reduces dust emission by concentrating dust particles on one side of a falling curtain of particles and spraying molten sulfur on that side of the curtain. Another aspect of this invention involves increasing the amount of sulfur sprayed into a curtain of falling particles as the average particle size increases.

DESCRIPTION OF THE INVENTION

Figure 1:
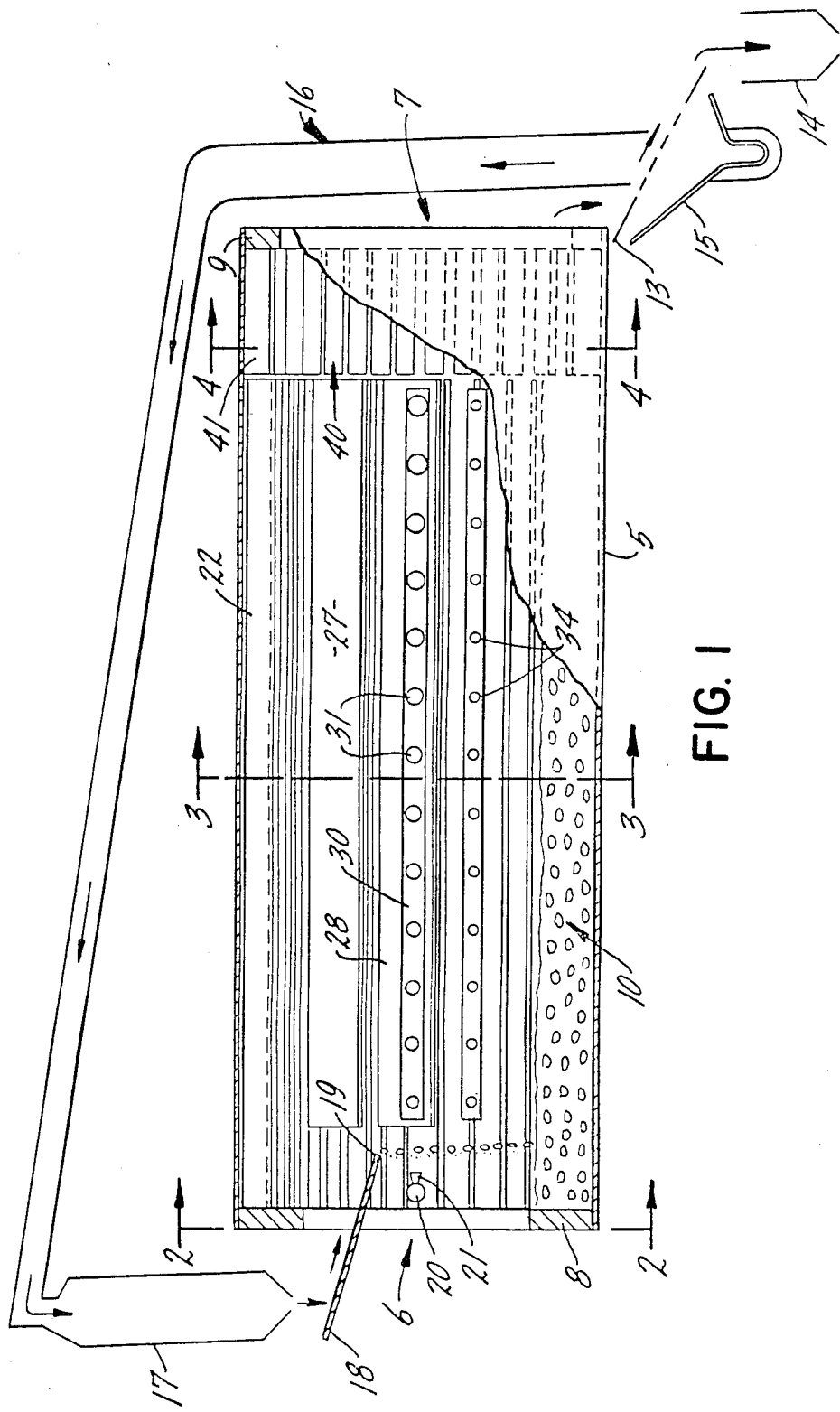
FIG. 1 is a schematic, partially cross sectional side view of a sulfur pelletizing system in accord with this invention.

The drawing shows a sulfur pelletizing system in which an open-ended, elongated hollow, cylindrical, rotatable drum 5 has its central axis 4 tilted slightly (i.e. less than 2°) with respect to the horizon from its entrance end 6 to its discharge end 7. End 6 is partially closed by an annular ring 8 and end 7 is partially closed by a similar ring 9. Ring 8 is wider than ring 9 in the radial direction, and end 6 is slightly higher than end 7 because of the slope of the drum axis 4. A bed 10 of solid sulfur particles tumbles in the bottom of drum 5 as the drum is rotated around its axis of rotation 4 by conventional means (not illustrated). As drum 5 rotates, one elongated edge 11 of bed 10 is elevated above the other elongated edge 12. The particles in bed 10 range in size from microscopic dust particles to the full sized, generally spherical pellets having a predetermined diameter in the range of about 2 to 20 m.m. that are the end product of this invention. The particles in bed 10 gradually move from end 6 to end 7 as drum 5 rotates, and then fall over the smaller discharge end ring 9 and out of drum 5 on to a screen 13 having openings of a predetermined size. Pellets having a diameter larger than the holes in screen 13 tumble down the screen and into a product hopper or storage silo 14. Particles that fall through screen 13 are guided by hopper 15 to conventional conveyor means 16 which transports these undersized particles to a particle recycle hopper 17.

The particles in hopper 17 vary in size from microscopic dust to almost pellet-sized particles which barely passed through the holes in screen 13. Particles are fed from hopper 17 on to a feed chute or conveyor 18 having a terminal end 19 that extends into the entrance opening at end 6. The particles from hopper 17 fall off the end 19 and form a falling curtain or shower of particles that extends down to bed 10. As the particles fed on to conveyor 18 travel down the conveyor into the interior of drum 5, the agitation and vibration to which they are subjected may classify the particles as to size, or such classification may be achieved by vibrating conveyor 18 in any known manner. The largest particles will rise to the top while the dust falls to the bottom of the layer of particles moving down conveyor 18. Thus, as the particles fall off the end 19 of the conveyor, most of the dust particles are concentrated at the surface of the falling curtain facing the outside of drum 5. To reduce the emission of dust from the system, a transverse header 20 having several nozzles 21 is located under conveyor 18 close to edge 19 on the side of the curtain of falling particles containing the concentration of dust. Molten sulfur is sprayed from nozzles 21 on to the curtain of particles. Since the dust is concentrated at the side of the falling curtain of particles closest to the spray nozzles, most of the dust is picked up by the molten sulfur. It is also possible to put an additional set of spray nozzles on the other side of the curtain of falling particles to further reduce dust emissions. To enable the sulfur spray to hit most of the dust particles, this curtain of particles should be relatively thin (e.g. about 1 inch).

Figure 3:
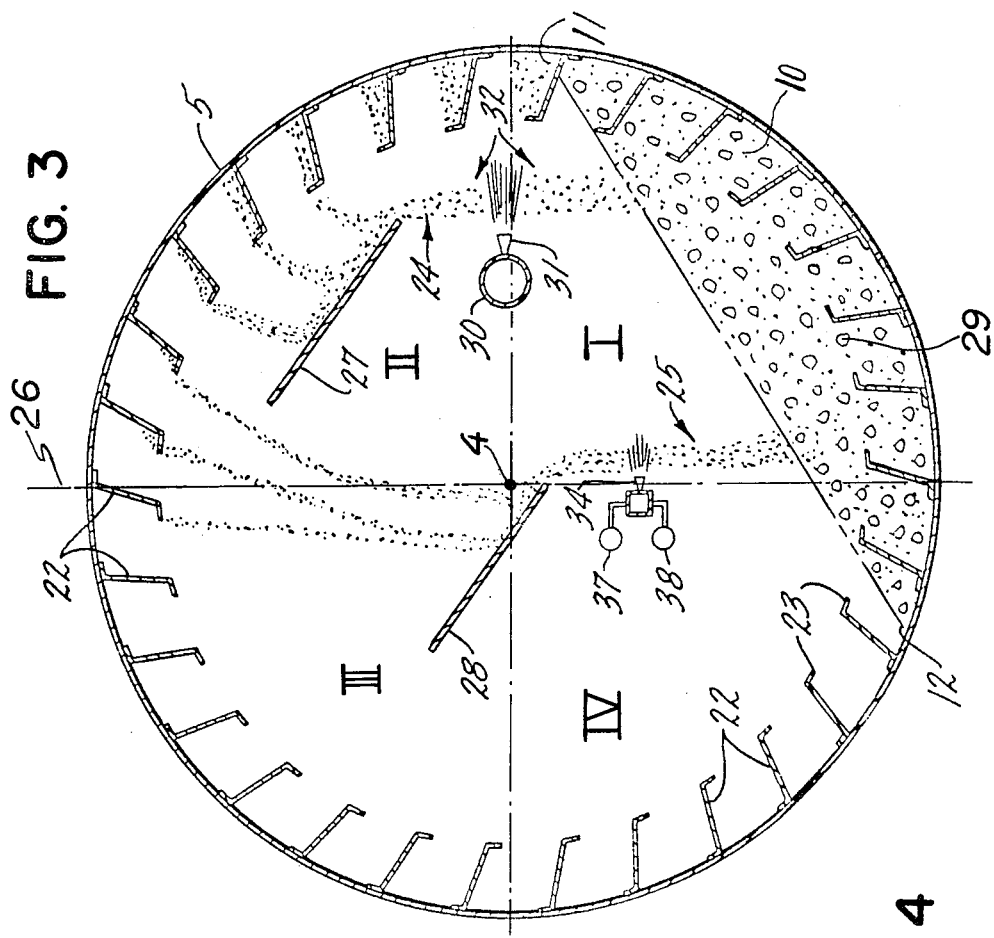
FIG. 3 is an enlarged cross sectional view taken along the line 3—3 in FIG. 1.
Figure 2:
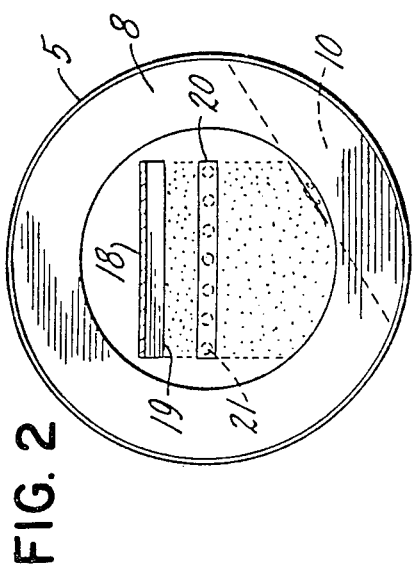
FIG. 2 is a cross sectional view taken along the line 2—2 in FIG. 1.
Figure 4:
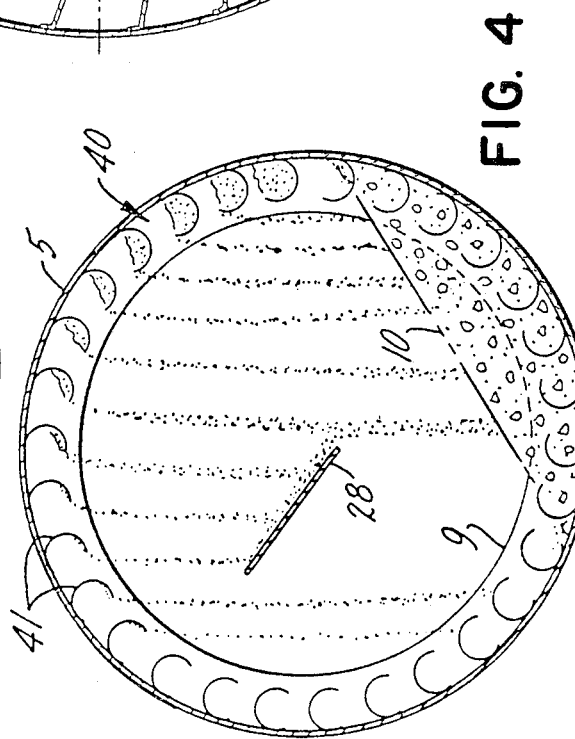
FIG. 4 is an enlarged cross sectional view taken along the line 4—4 in FIG. 1.

Drum 5 rotates in a counterclockwise direction when viewed in FIGS. 2-4. A series of essentially identical particle lifting flights 22 are equally spaced around the inside surface of drum 5, and project generally toward the center 4 of the drum. Flights 22 extend longitudinally for about 80-90% of the length of drum 5. As flights 22 move through bed 10, they scoop particles from the bed and raise the particles to the upper portion of drum 5. Flights 22 are flat with short, obtusely angled tips 23 so that each flight will have dropped essentially all of the particles it is carrying by the time the flight has moved a short distance past the highest point in drum 5. This produces a concentrated shower of falling particles in the right hand quadrants I and II of drum 5, as seen in FIG. 3, with a much smaller number of particles falling into the left hand quadrants III and IV near the vertical center line 26 of the drum.

Drum 5 has means located within it for deflecting the shower of falling particles into two, separated, distinct, generally continuous curtains 24 and 25 which fall into bed 10 at spaced locations. A first elongated deflector plate 27 extending lengthwise of drum 5 is located above the center 4 of the drum, with at least a major portion of plate 27 being located in that upper quadrant II of the drum, when viewed in a plane perpendicular to the axis of the drum, which contains the highest ascending flights 22. Such particles are deflected by plate 27 into a relatively thick (e.g. 9-12 inches) first curtain 24 of particles that fall into bed 10 between the center 29 of the bed and its elevated edge 11. A second elongated deflector plate 28 extending for the full length of drum 5 is located near the center 4 of the drum, with at least a major portion of plate 28 being located in the quadrants III and IV of the drum, when viewed in a plane perpendicular to the axis of the drum, which contain the descending flights 22. Plate 28 should be wide enough to be hit by substantially all of the particles which fall beyond plate 27 in the direction of drum rotation. Such particles are deflected by plate 28 into a relatively thin (e.g. one inch) second curtain 25 of particles that fall into bed 10 between the center 29 of the bed and its lower edge 12. Thus, plate 28 reduces breakage of falling particles by preventing the particles from striking the exposed tips 23 of flights 22 near the bottom of drum 5. Plates 27 and 28 should be sloped at an angle of at least about 35° counter to the direction of drum rotation.

A steam-jacketed molten sulfur header 30 having a series of sulfur spray nozzles 31 spaced therealong extends longitudinally of drum 5 beneath plate 27. Nozzles 31 are generally aligned horizontally in the direction of movement of the particles in bed 10, and spray atomized molten sulfur at a pressure in the range of about 200-500 p.s.i. and a temperature above 260° F. into a zone 32 through which the first curtain 24 of particles falls. The particles in bed 10 increase in average size as they migrate from entrance end 6 to discharge end 7, so the amount of sulfur sprayed into curtains 24 should be increased in the direction of particle migration. This can be accomplished by increasing the pressure at the nozzles 31 from entrance end 6 to discharge end 7, or as shown in FIG. 1, by increasing the size (i.e. effective flow area) of the nozzles 31 from the entrance end to the discharge end of drum 5. Additional headers and series of spaced nozzles may be aligned parallel with those shown herein. The stationary portions of the apparatus located within drum 5 should be supported in conventional manner by means (not illustrated) extending outside of the drum.

The temperature of zone 32 through which particles fall should be lowered to the range of about 160°-200° F. despite the hot sulfur sprayed by nozzles 31. A direct spraying of water in this zone or into bed 10 will result in poor quality non-uniform pellets having surface defects and voids. Therefore, water must be brought to zone 32 by indirect methods such as removing a small number of particles from bed 10, wetting the removed particles, and dropping the wetted particles through zone 32. Evaporation of the water from the particles as they fall through zone 32 lowers the temperature of the zone to the required range.

Wetting of particles while they are removed from bed 10 can be accomplished by locating a series of longitudinally spaced humidification nozzles 34 underneath second plate 28 in the lower portion of drum 5 near its center where nozzles 34 can spray a liquid into second curtain 25 above bed 10. A water header 37 and a compressed air header 38 feed into nozzles 34, and atomized water is sprayed on the surface of the falling particles in second curtain 25. After the moist particles drop into bed 10, they are mixed with the unwetted particles and some of their moisture is evaporated because of the higher surrounding temperature; this keeps bed 10 in the temperature range of about 120°-180° F. required for production of quality pellets resulting from solidification of the liquid sulfur sprayed on the particles. As drum 5 rotates, the mixture of wetted and other particles is elevated above zone 32 by flights 22 and dropped on to plate 27. Most of the wetted particles are deflected into first curtain 24, where the rest of their moisture is released to the surrounding air by evaporation. This lowers the temperature of zone 32. The spray from nozzles 34 also humidifies and lowers the temperature of air flowing counter-current through drum 5.

The discharge end 7 of drum 5 has a cooling section 40 in which the temperature of the particles is cooled to the range of about 120°-160° F. This facilitates handling of the finished pellets by eliminating stickiness and dust that often forms when the pellets reach ambient temperature. The shape of lifting flights 41 in section 40 is different from that of the flights 22 in the rest of drum 5. Flights 41 have a generally C-shaped or semi-circular cross section that causes them to distribute falling particles generally uniformly throughout cooling section 40, except where the particles hit plate 28 and are deflected away from the exposed tips of the flights. Outside air is drawn into end 7 and is forced through drum 5 and out end 6 in any conventional manner. This cools the particles that fall over rim 9 on to screen 13 to a temperature lower than the average operating temperature in drum 5.

The full sized sulfur pellets that do not pass through screen 13 are not returned to drum 5, and they must be replaced with seed or nuclei particles to keep the system operating continuously. These small particles can be produced in drum 5 by intermittantly raising the temperature of bed 10 by at least about 40° F. for brief periods. When the temperature of bed 10 is raised to the range of about 160°-220° F., the liquid sulfur sprayed on the falling particles in zone 32 will not completely solidify immediately. The sprayed sulfur coating will remain slightly soft or plastic on the surface of the particles. As the particles with this plastic coating are tumbled in bed 10, the abrading action of the other particles will rub or break off small pieces of this soft coating having a diameter in the size range of about 0.1 to 1.0 m.m. After the broken-off pieces solidify, they become the seed nuclei of the system. The temperature of bed 10 need be raised for only about 2% of the time to produce sufficient seed nuclei to keep the system operating continuously. For example, in an installation producing twenty long tons per hour of sulfur pellets, the temperature of bed 10 was raised about 40° F. for about ten minutes every eight hours of drum operating time and sufficient seed nuclei were produced.

It has thus been shown that by the practice of this invention solid sulfur pellets can be produced continuously by spraying molten sulfur into a curtain 24 of falling particles that were lifted from a rotating bed 10 of particles. The temperature of the bed and of the curtain of falling particles are lowered to the temperature ranges that result in quality pellets without spraying water directly on the bed or into the falling curtain. Instead water is sprayed into a separate and distinct curtain 25 of falling particles at a location spaced from the first curtain 24. This prevents the water spray from interfering with the adhesion or shape of the molten sulfur coating the surface of the sprayed particles. Breakage of particles is reduced by plate 28. Dust emissions are controlled by classifying dust particles to one side of the particle return stream at entrance end 6, and then spraying that side of the stream with molten sulfur. This greatly enlarges the size of the dust particles by coating them with sulfur. Seed nuclei are generated economically without lowering the quality of the final pellets by intermittantly raising the temperature of bed 10 to a level that keeps the coating on the freshly sprayed particles plastic for only a short time. This permits the abrasion between particles tumbling in bed 10 to scrape off small pieces of sulfur that solidify into the seed nuclei.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for producing solid pellets, comprising:
A. rotatable, generally cylindrical drum having a bed of particles therein:
B. a plurality of particle lifting flights extending from the inside surface of said drum generally toward its center, whereby rotation of said drum causes said flights to lift particles from said bed to an upper zone in said drum and to then drop said particles so that said particles fall toward said bed;
C. first means within said drum for deflecting some of the falling particles into a first generally continuous curtain of particles which fall into said bed at a first location;
D. first means for spraying into said first curtain of particles above said bed a liquified substance which adheres to the surface of the falling particles in said first curtain;
E. second means within said drum for deflecting other of the falling particles into a second generally continuous curtain of particles which fall into said bed at a second location that is spaced from said first location, said first and second curtains being separated and distinct from each other; and
F. second means for spraying into said second curtain of particles above said bed a cooling liquid that wets the falling particles in said second curtain and thereby lowers the temperature within said drum to a range within which said liquified substance solidifies on said particles and forms said pellets.

2. Apparatus for pelletizing sulfur, comprising:
A. an elongated, rotatable, generally cylindrical, open-ended drum having its axis of rotation inclined slightly with respect to the horizon from an entrance end to a discharge end, whereby rotation of said drum causes sulfur particles forming a bed therein to move from said entrance end toward said discharge end, and one elongated edge of said bed is elevated above its other elongated edge;
B. a plurality of particle lifting flights extending from the inside surface of said drum generally toward its center, whereby rotation of said drum causes said flights to lift particles from said bed to an upper zone in said drum and to then drop said particles so that said particles fall toward said bed;
C. first means within said drum for deflecting some of the falling particles into a first generally continuous curtain of particles which fall into said bed at a first location;
D. first means for spraying liquid sulfur on to the surface of the particles of said first curtain above said bed;
E. second means within said drum for deflecting other of the falling particles into a second generally continuous curtain of particles which fall into said bed at a second location that is spaced from said first location, said first and second curtains being separated and distinct from each other; and
F. second means for spraying into said second curtain of particles above said bed, a cooling liquid that wets the falling particles in said second curtain and thereby lowers the temperature within said drum to a range within which said liquid sulfur solidifies on said particles and forms pellets.

3. The apparatus of claim 2, further comprising:
A. the first means for deflecting falling particles comprising a first elongated deflector plate extending lengthwise of said drum, said first elongated deflector plate being located within said drum above the center of said drum and being inclined and positioned so as to deflect the falling particles which define said first curtain into said bed between the center of said bed and said one elevated edge;
B. the second means for deflecting falling particles comprising a second elongated deflector plate extending lengthwise of said drum, said second elongated deflector plate being located within said drum and being inclined and positioned so as to deflect the falling particles which define said second curtain into said bed between the center of said bed and said other edge.

4. The apparatus of claim 3, wherein at least a major portion of said first elongated deflector plate is located within that upper quadrant of said drum, when viewed in a plane perpendicular to the axis of said drum, which contains the highest ascending lifting flights.

5. The apparatus of claim 3 wherein at least a major portion of said second elongated deflector plate is located within those quadrants, when viewed in a plane perpendicular to the axis of said drum, which contain the descending flights.

6. The apparatus of claim 2, further comprising:

A. said first means for spraying liquid sulfur comprising a series of spaced nozzles generally aligned horizontally in the direction of movement of the particles in said bed; and B. means for increasing the amount of liquid sulfur sprayed into said first curtain by said nozzles from the entrance end to the discharge end of said drum.

7. The apparatus of claim 5, wherein the effective flow area of said nozzles increases from the entrance end to the discharge end of said drum.

8. Apparatus for pelletizing sulfur, comprising:
A. an elongated, rotatable, generally cylindrical, open-ended drum having its axis of rotation inclined slightly with respect to the horizon from an entrance end to a discharge end, whereby rotation of said drum causes solid sulfur particles forming a bed therein to move from said entrance end toward said discharge end, and one elongated edge of said bed is elevated above its other elongated edge;
B. a plurality of particle lifting flights having obtusely angled tips extending from the inside surface of said drum generally toward its center, whereby rotation of said drum causes said flights to lift particles from said bed to an upper zone in said drum and to then drop said particles so that they fall toward said bed;
C. a first elongated deflector plate extending lengthwise of said drum, said first elongated deflector plate being located within said drum above the center of said drum and being inclined and positioned so as to deflect falling particles into a distinct first curtain of falling particles which return to said bed between the center of said bed and said one elevated edge, at least a major portion of said first deflector plate being located within that upper quadrant of said drum, when viewed in a plane perpendicular to the axis of said drum, which contains the highest ascending lifting flights;
D. a series of spaced nozzles generally aligned horizontally in the direction of movement of the particles in said bed located below said first elongated deflector plate for spraying liquid sulfur into said first curtain of particles, the effective flow area of said nozzles increasing from the entrance end to the discharge end of said drum for increasing the amount of liquid sulfur sprayed into said first curtain at the discharge end of said drum;
E. a second elongated deflector plate extending lengthwise of said drum, said second elongated deflector plate being located within said drum and being inclined and positioned so as to deflect the falling particles which define said second curtain into said bed between the center of said bed and said other edge, at least a major portion of said second elongated deflector plate being located within those quadrants, when viewed in a plane perpendicular to the axis of said drum, which contain the descending flights;
F. a plurality of nozzles located below said second plate for spraying cooling water on to the particles in said second curtain so as to lower the temperature in said drum to a range within which said liquid sulfur solidifies on said particles to form pellets; and
G. a cooling section of said drum adjacent said discharge end having particle lifting flights with generally C-shaped cross sections for distributing falling particles relatively uniformly throughout said cooling section.

9. Apparatus for producing solid pellets, comprising:
A. an elongated, rotatable, generally cylindrical, open-ended drum having its axis of rotation inclined slightly with respect to the horizon from an entrance end to a discharge end, whereby rotation of said drum causes solid particles forming a bed therein to move from said entrance end toward said discharge end;
B. a plurality of particle lifting flights extending from the inside surface of said drum generally toward its center, whereby rotation of said drum causes said flights to lift particles from said bed to an upper zone in said drum and to then drop said particles so that said particles fall toward said bed;
C. a series of spaced nozzles generally aligned horizontally in the direction of movement of the particles in said bed for spraying a liquid substance into the falling particles;
D. means for increasing the amount of liquified substance sprayed into said falling particles by said nozzles from the entrance end to the discharge end of said drum; and
E. means for lowering the temperature within said drum so that said liquified substance solidifies on said particles.

10. The apparatus of claim 8, wherein the effective flow area of said nozzles increases from the entrance end to the discharge end of said drum.

* * * * *